(12) United States Patent
Punyamurtula et al.

(10) Patent No.: US 8,583,894 B2
(45) Date of Patent: Nov. 12, 2013

(54) HYBRID PREFETCH METHOD AND APPARATUS

(75) Inventors: Swamy Punyamurtula, Austin, TX (US); Bharath Narasimha Swamy, Bangalore (IN)

(73) Assignee: Advanced Micro Devices, Sunnyvale, CA (US)

( * ) Notice: Subject to any disclaimer, the term of this patent is extended or adjusted under 35 U.S.C. 154(b) by 293 days.

(21) Appl. No.: 12/878,513

(22) Filed: Sep. 9, 2010

(65) Prior Publication Data

US 2012/0066455 A1    Mar. 15, 2012

(51) Int. Cl.
*G06F 12/08*    (2006.01)

(52) U.S. Cl.
USPC .................. 711/213; 711/137; 711/E12.004; 711/E12.057

(58) Field of Classification Search
USPC .................. 711/137, 213, E12.004, E12.057
See application file for complete search history.

(56) References Cited

U.S. PATENT DOCUMENTS

| | | | | |
|---|---|---|---|---|
| 5,357,618 A | * | 10/1994 | Mirza et al. | 711/3 |
| 5,623,615 A | * | 4/1997 | Salem et al. | 712/238 |
| 5,941,981 A | * | 8/1999 | Tran | 712/207 |
| 6,055,621 A | * | 4/2000 | Puzak | 712/207 |
| 6,401,193 B1 | * | 6/2002 | Afsar et al. | 712/207 |
| 7,877,580 B2 | | 1/2011 | Eickemeyer | |
| 7,930,485 B2 | | 4/2011 | Fertig | |
| 7,958,316 B2 | | 6/2011 | Speight | |
| 2002/0069375 A1 | * | 6/2002 | Bowen | 713/400 |
| 2004/0225758 A1 | * | 11/2004 | Moyer | 710/22 |
| 2005/0010880 A1 | * | 1/2005 | Schubert et al. | 716/4 |
| 2006/0041723 A1 | * | 2/2006 | Hakura et al. | 711/137 |
| 2006/0053256 A1 | * | 3/2006 | Moyer et al. | 711/137 |
| 2006/0174228 A1 | * | 8/2006 | Radhakrishnan et al. | 717/127 |
| 2006/0248281 A1 | * | 11/2006 | Al-Sukhni et al. | 711/137 |
| 2008/0244232 A1 | * | 10/2008 | Sherman et al. | 712/207 |
| 2009/0217004 A1 | * | 8/2009 | Van De Waerdt et al. | 712/207 |
| 2009/0287884 A1 | * | 11/2009 | Toyoshima et al. | 711/137 |
| 2009/0300340 A1 | * | 12/2009 | Chou et al. | 712/237 |
| 2010/0180081 A1 | * | 7/2010 | Bose et al. | 711/122 |
| 2010/0211745 A1 | * | 8/2010 | Jeddeloh | 711/137 |
| 2011/0066811 A1 | * | 3/2011 | Sander et al. | 711/137 |

* cited by examiner

*Primary Examiner* — Hal Schnee

(74) *Attorney, Agent, or Firm* — Meyertons Hood Kivlin Kowert & Goetzel; Erik A. Heter

(57) ABSTRACT

A hybrid prefetch method and apparatus is disclosed. A processor includes a hybrid prefetch unit configured to generate addresses for accessing data from a system memory. The hybrid prefetch unit includes a first prediction unit configured to generate a first memory address according to a first prefetch algorithm and a second prediction unit configured to generate a second memory address according to a second prefetch algorithm. The hybrid prefetcher further includes an arbitration unit configured to select one of the first and second memory addresses and further configured to provide the selected one of the first and second memory addresses during a prefetch operation.

20 Claims, 6 Drawing Sheets

HYBRID PREFETCH METHOD AND APPARATUS

BACKGROUND

1. Field of the Invention

This invention relates to processors, and more particularly, to prefetchers.

2. Description of the Related Art

Cache memories figure prominently in the performance of computer system processors. As processor technology has advanced and the demand for performance has increased, the number and capacity of cache memories has followed. Some processors may have a single cache or single level of cache memory, while others may have multiple levels of caches. Cache memories may be defined by levels, based on their proximity to execution units of a processor core. For example, a level one (L1) cache may be the closest cache to the execution unit(s), a level two (L2) cache may be the second closest to the execution unit(s), and an level three (L3) cache may be the third closest to the execution unit(s).

Data may be typically loaded into a cache memory responsive to a cache miss. A cache miss occurs when requested data is not found in the cache. Cache misses are undesirable, as the performance penalty associated with a cache miss can be significant. Accordingly, some processors employ one or more prefetchers. A prefetcher may analyze data access patterns in order to predict from where in memory future accesses will be performed. Based on these predictions, the prefetcher may then obtain data from the memory and store it into the cache. In processors having multiple prefetchers, the different prefetchers may utilize different algorithms to independently and concurrently prefetch data into a cache. Accordingly, one prefetcher may store information into a cache using stride prefetching (loading data located at fixed address intervals from one another), while another prefetcher may store information into the cache based on instruction pointer (IP) data.

SUMMARY OF EMBODIMENTS OF THE DISCLOSURE

A hybrid prefetch method and apparatus is disclosed. In one embodiment, a processor includes a hybrid prefetch unit configured to generate addresses for accessing data from a system memory. The hybrid prefetch unit includes a first prediction unit configured to generate a first memory address according to a first prefetch algorithm and a second prediction unit configured to generate a second memory address according to a second prefetch algorithm. The hybrid prefetcher further includes an arbitration unit configured to select one of the first and second memory addresses and further configured to provide the selected one of the first and second memory addresses during a prefetch operation.

In one embodiment, a method of operating a hybrid prefetch unit includes a first prediction unit generating a first memory address according to a first prefetch algorithm and a second prediction unit generating a second memory address according to a second prefetch algorithm. The method further includes an arbitration unit selecting one of the first and second memory addresses, and accessing data from the selected one of the first and second memory addresses.

BRIEF DESCRIPTION OF THE DRAWINGS

Other aspects of the invention will become apparent upon reading the following detailed description and upon reference to the accompanying drawings in which.

Figure 1:
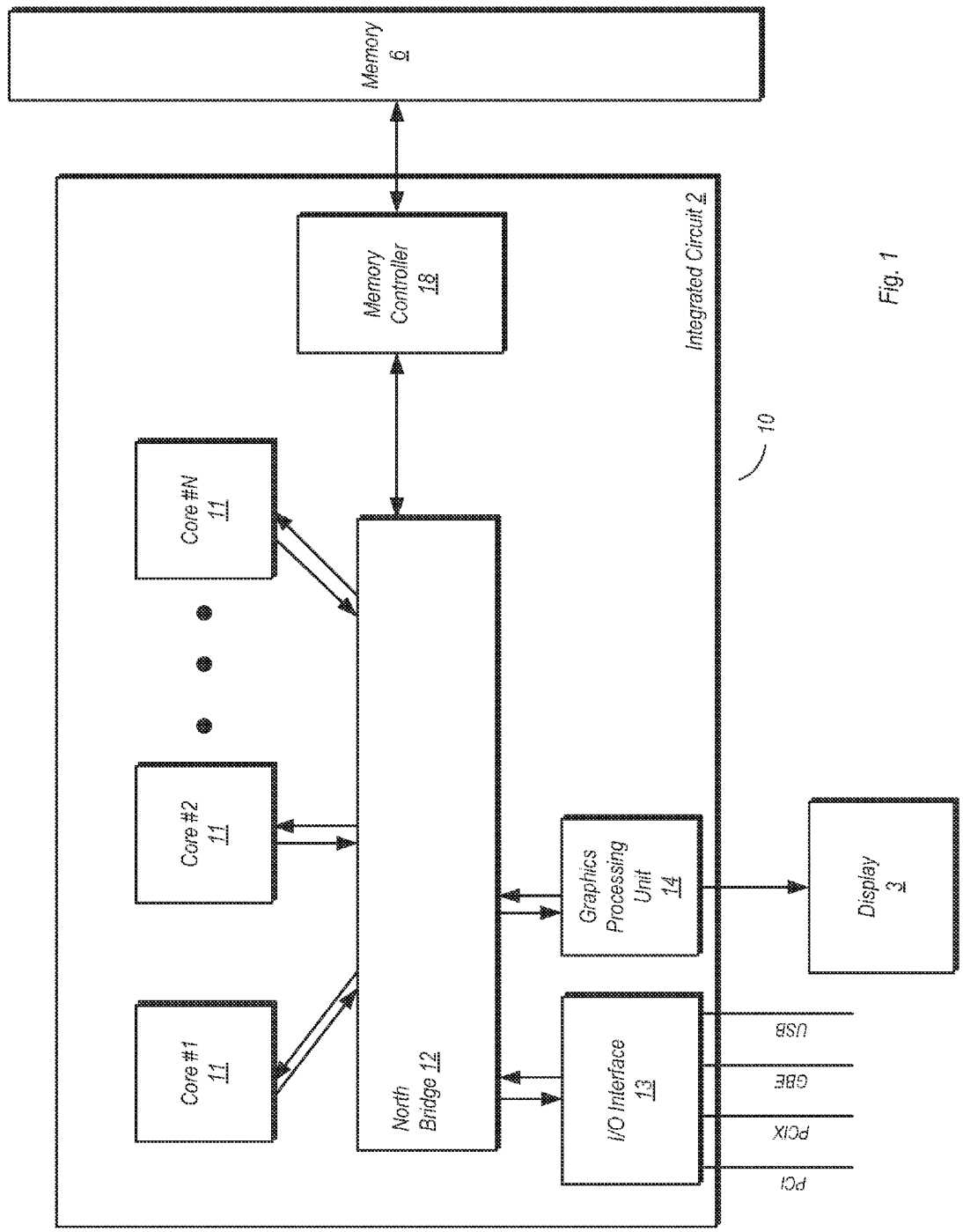
FIG. 1 is a block diagram of embodiment of a computer system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Overview:

The various embodiments of an apparatus and methods disclosed herein are directed to the use of a hybrid prefetcher for prefetching data for use by a processor or core(s) of a processor. As used herein, the term hybrid prefetcher (as well as related terms, such as hybrid prefetch unit) may be defined as a prefetch unit that concurrently generates two or more prefetch addresses according to two or more different prefetch algorithms. The term prefetching may be defined as speculatively accessing data from memory in anticipation of its future use by a processor core. Prefetched data may be loaded into registers, an L1 cache, and/or other caches. As used herein, the term 'data' may refer to any information that may be stored in memory, including data that can be used as operands in the execution of instructions, as well as instructions themselves.

A hybrid prefetcher may include at least a first prefetch unit and a second prefetch unit. Each of the prefetch units may generate memory addresses from which data may be prefetched. The prefetch units may use different algorithms for generating memory addresses. For example, one prefetch unit may be configured to generate memory addresses based on a stride prefetching algorithm, while another prefetch unit may be configured to generate memory addresses based on an instruction pointer (IP) based prefetching algorithm. These examples are not intended to be limiting, however, and embodiments utilizing other prefetching algorithms are possible and contemplated. Furthermore, embodiments of a hybrid prefetcher having more than two prefetch units are also possible and contemplated.

An arbitration unit may select a generated prefetch address from one of the prefetch units based on an arbitration scheme. The selected prefetch address may be used for a prefetch operation, while the non-selected address (or addresses in embodiments having more than two prefetch units) is not used in the same cycle. In general, for a single prefetch operation, the arbitration unit may select one of two or more predicted addresses and may provide the selected address for use in the prefetch operation. While the non-selected addresses may be unused for that particular prefetch operation, they may nevertheless be recorded and stored for later use in determining the accuracy of the prediction units from which they were generated.

Data may be prefetched from the selected one of the addresses provided by the arbitration unit. Various arbitration schemes are possible and contemplated, including accuracy-based arbitration (i.e. determining which prefetcher is more accurate), round robin arbitration, or any other suitable arbitration scheme. The arbitration unit may employ different arbitration schemes at different times. Furthermore, the arbitration unit may be configured to inhibit the issuance of prefetch addresses by the prefetch unit at certain times, e.g., when the accuracy of both prefetch units falls below a certain threshold.

Computer System Including System on a Chip:

FIG. 1 is a block diagram of one embodiment of a computer system 10. In the embodiment shown, computer system 10 includes integrated circuit (IC) 2 coupled to a memory 6. In the embodiment shown, IC 2 is a system on a chip (SOC) having a number of processor cores 11, which are processor cores in this embodiment. In various embodiments, the number of processor cores may be as few as one, or may be as many as feasible for implementation on an IC die. In multi-core embodiments, processor cores 11 may be identical to each other (i.e. symmetrical multi-core), or one or more cores may be different from others (i.e. asymmetric multi-core). Processor cores 11 may each include one or more execution units, cache memories, schedulers, branch prediction circuits, and so forth. Furthermore, each of processor cores 11 may be configured to assert requests for access to memory 6, which may function as the main memory for computer system 10. Such requests may include read requests and/or write requests, and may be initially received from a respective processor core 11 by north bridge 12. Requests for access to memory 6 may be initiated responsive to the execution of certain instructions, and may also be initiated responsive to prefetch operations.

I/O interface 13 is also coupled to north bridge 12 in the embodiment shown. I/O interface 13 may function as a south bridge device in computer system 10. A number of different types of peripheral buses may be coupled to I/O interface 13. In this particular example, the bus types include a peripheral component interconnect (PCI) bus, a PCI-Extended (PCI-X), a PCIE (PCI Express) bus, a gigabit Ethernet (GBE) bus, and a universal serial bus (USB). However, these bus types are exemplary, and many other bus types may also be coupled to I/O interface 13. Peripheral devices may be coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices that may be coupled to I/O unit 13 via a corresponding peripheral bus may assert memory access requests using direct memory access (DMA). These requests (which may include read and write requests) may be conveyed to north bridge 12 via I/O interface 13.

In the embodiment shown, IC 2 includes a graphics processing unit 14 that is coupled to display 3 of computer system 10. Display 3 may be a flat-panel LCD (liquid crystal display), plasma display, a CRT (cathode ray tube), or any other suitable display type. GPU 14 may perform various video processing functions and provide the processed information to display 3 for output as visual information.

Memory controller 18 in the embodiment shown is coupled to north bridge 12, and in some embodiments, may actually be a component of north bridge 12. Memory controller 18 may receive memory requests conveyed from north bridge 12. Data accessed from memory 6 responsive to a read request (including prefetches) may be conveyed by memory controller 18 to the requesting agent via north bridge 12. Responsive to a write request, memory controller 18 may receive both the request and the data to be written from the requesting agent via north bridge 12. If multiple memory access requests are pending at a given time, memory controller 18 may arbitrate between these requests.

Memory 6 in the embodiment shown may be implemented in one embodiment as a plurality of memory modules. Each of the memory modules may include one or more memory devices (e.g., memory chips) mounted thereon. In another embodiment, memory 6 may include one or more memory devices mounted on a motherboard or other carrier upon which IC 2 may also be mounted. In yet another embodiment, at least a portion of memory 6 may be implemented on the die of IC 2 itself. Embodiments having a combination of the various implementations described above are also possible and contemplated. Memory 6 may be used to implement a random access memory (RAM) for use with IC 2 during operation. The RAM implemented may be static RAM (SRAM) or dynamic RAM (DRAM). Type of DRAM that may be used to implement memory 6 include (but are not limited to) double data rate (DDR) DRAM, DDR2 DRAM, DDR3 DRAM, and so forth.

Figure 2:
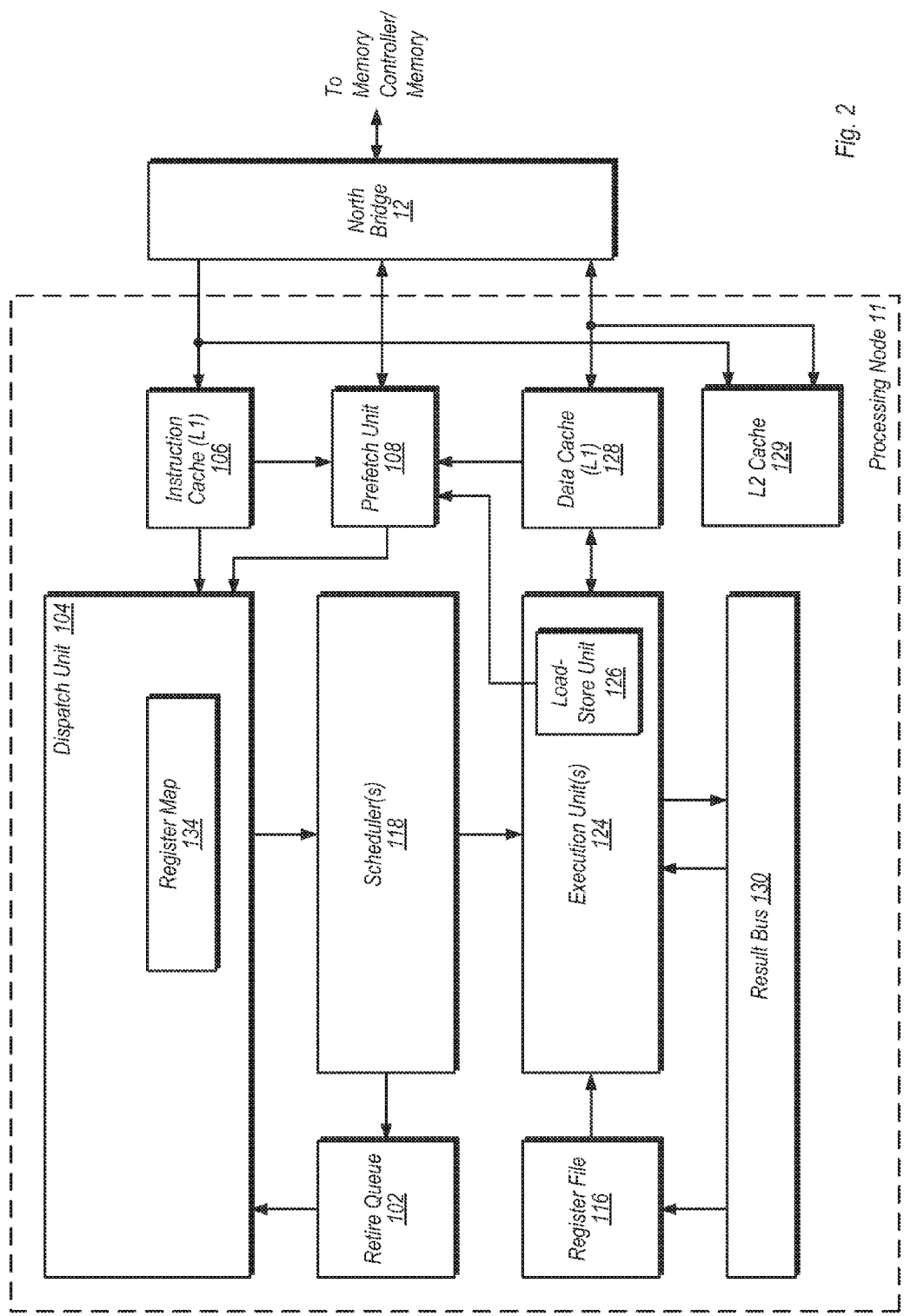
FIG. 2 is a block diagram of one embodiment of a processing node.

Exemplary Processing Node:

FIG. 2 is a block diagram of one embodiment of a processing node 11. The processing node 11 is configured to execute instructions stored in a system memory (e.g., memory 6 of FIG. 1). Many of these instructions may also operate on data stored in memory 6. It is noted that the memory 6 may be physically distributed throughout a computer system and/or may be accessed by one or more processing nodes 11.

In the illustrated embodiment, the processing node 11 may include a level one (L1) instruction cache 106 and an L1 data cache 128. The processing node 11 may include a prefetch unit 108 coupled to the instruction cache 106, which will be discussed in additional detail below. A dispatch unit 104 may be configured to receive instructions from the instruction cache 106 and to dispatch operations to the scheduler(s) 118. One or more of the schedulers 118 may be coupled to receive dispatched operations from the dispatch unit 104 and to issue operations to the one or more execution unit(s) 124. The execution unit(s) 124 may include one or more integer units, one or more floating point units. At least one load-store unit 126 is also included among the execution units 124 in the embodiment shown. Results generated by the execution unit(s) 124 may be output to one or more result buses 130 (a single result bus is shown here for clarity, although multiple result buses are possible and contemplated). These results may be used as operand values for subsequently issued instructions and/or stored to the register file 116. A retire queue 102 may be coupled to the scheduler(s) 118 and the dispatch unit 104. The retire queue 102 may be configured to determine when each issued operation may be retired.

In one embodiment, the processing node 11 may be designed to be compatible with the x86 architecture (also known as the Intel Architecture-32, or IA-32). In another embodiment, the processing node 11 may be compatible with a 64-bit architecture. Embodiments of processing node 11 compatible with other architectures are contemplated as well.

Note that the processing node 11 may also include many other components. For example, the processing node 11 may include a branch prediction unit (not shown) configured to predict branches in executing instruction threads. In some embodiments (e.g., if implemented as a stand-alone processor), processing node 11 may also include a memory controller configured to control reads and writes with respect to memory 6.

The instruction cache 106 may store instructions for fetch by the dispatch unit 104. Instruction code may be provided to the instruction cache 106 for storage by prefetching code from the system memory 200 through the prefetch unit 108. Instruction cache 106 may be implemented in various configurations (e.g., set-associative, fully-associative, or direct-mapped).

Processing node 11 may also include a level two (L2) cache 129. Whereas instruction cache 106 may be used to store instructions and data cache 128 may be used to store data (e.g., operands), L2 cache 129 may be a unified used to store instructions and data. Although not explicitly shown here, some embodiments may also include a level three (L3) cache, which may also be a unified cache. In general, the number of cache levels may vary from one embodiment to the next.

The dispatch unit 104 may output operations executable by the execution unit(s) 124 as well as operand address information, immediate data and/or displacement data. In some embodiments, the dispatch unit 104 may include decoding circuitry (not shown) for decoding certain instructions into operations executable within the execution unit(s) 124. Simple instructions may correspond to a single operation. In some embodiments, more complex instructions may correspond to multiple operations. Upon decode of an operation that involves the update of a register, a register location within register file 116 may be reserved to store speculative register states (in an alternative embodiment, a reorder buffer may be used to store one or more speculative register states for each register and the register file 116 may store a committed register state for each register). A register map 134 may translate logical register names of source and destination operands to physical register numbers in order to facilitate register renaming. The register map 134 may track which registers within the register file 116 are currently allocated and unallocated.

The processing node 11 of FIG. 2 may support out of order execution. The retire queue 102 may keep track of the original program sequence for register read and write operations, allow for speculative instruction execution and branch misprediction recovery, and facilitate precise exceptions. In some embodiments, the retire queue 102 may also support register renaming by providing data value storage for speculative register states (e.g. similar to a reorder buffer). In other embodiments, the retire queue 102 may function similarly to a reorder buffer but may not provide any data value storage. As operations are retired, the retire queue 102 may deallocate registers in the register file 116 that are no longer needed to store speculative register states and provide signals to the register map 134 indicating which registers are currently free. By maintaining speculative register states within the register file 116 (or, in alternative embodiments, within a reorder buffer) until the operations that generated those states are validated, the results of speculatively-executed operations along a mispredicted path may be invalidated in the register file 116 if a branch prediction is incorrect.

In one embodiment, a given register of register file 116 may be configured to store a data result of an executed instruction and may also store one or more flag bits that may be updated by the executed instruction. Flag bits may convey various types of information that may be important in executing subsequent instructions (e.g. indicating a carry or overflow situation exists as a result of an addition or multiplication operation. Architecturally, a flags register may be defined that stores the flags. Thus, a write to the given register may update both a logical register and the flags register. It should be noted that not all instructions may update the one or more flags.

The register map 134 may assign a physical register to a particular logical register (e.g. architected register or microarchitecturally specified registers) specified as a destination operand for an operation. The dispatch unit 104 may determine that the register file 116 has a previously allocated physical register assigned to a logical register specified as a source operand in a given operation. The register map 134 may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in the register file 116) through load-store unit 126. Operand data values may be provided to the execution unit(s) 124 when the operation is issued by one of the scheduler(s) 118. Note that in alternative embodiments, operand values may be provided to a corresponding scheduler 118 when an operation is dispatched (instead of being provided to a corresponding execution unit 124 when the operation is issued).

As used herein, a scheduler is a device that detects when operations are ready for execution and issues ready operations to one or more execution units. For example, a reservation station may be one type of scheduler. Independent reservation stations per execution unit may be provided, or a central reservation station from which operations are issued may be provided. In other embodiments, a central scheduler which retains the operations until retirement may be used. Each scheduler 118 may be capable of holding operation information (e.g., the operation as well as operand values, operand tags, and/or immediate data) for several pending operations awaiting issue to an execution unit 124. In some embodiments, each scheduler 118 may not provide operand value storage. Instead, each scheduler may monitor issued operations and results available in the register file 116 in order to determine when operand values will be available to be read by the execution unit(s) 124 (from the register file 116 or the result bus 130).

The prefetch unit 108 may prefetch instruction code from the memory 6 for storage within the instruction cache 106. In the embodiment shown, prefetch unit 108 is a hybrid prefetch unit that may employ two or more different ones of a variety of specific code prefetching techniques and algorithms. The prefetching algorithms implemented by prefetch unit 108 may be used to generate address from which data may be prefetched and loaded into registers and/or a cache. Prefetch unit 108 may be configured to perform arbitration in order to select which of the generated addresses is to be used for performing a given instance of the prefetching operation. An exemplary embodiment of a prefetch unit 108 will now be discussed in further detail.

Figure 3:
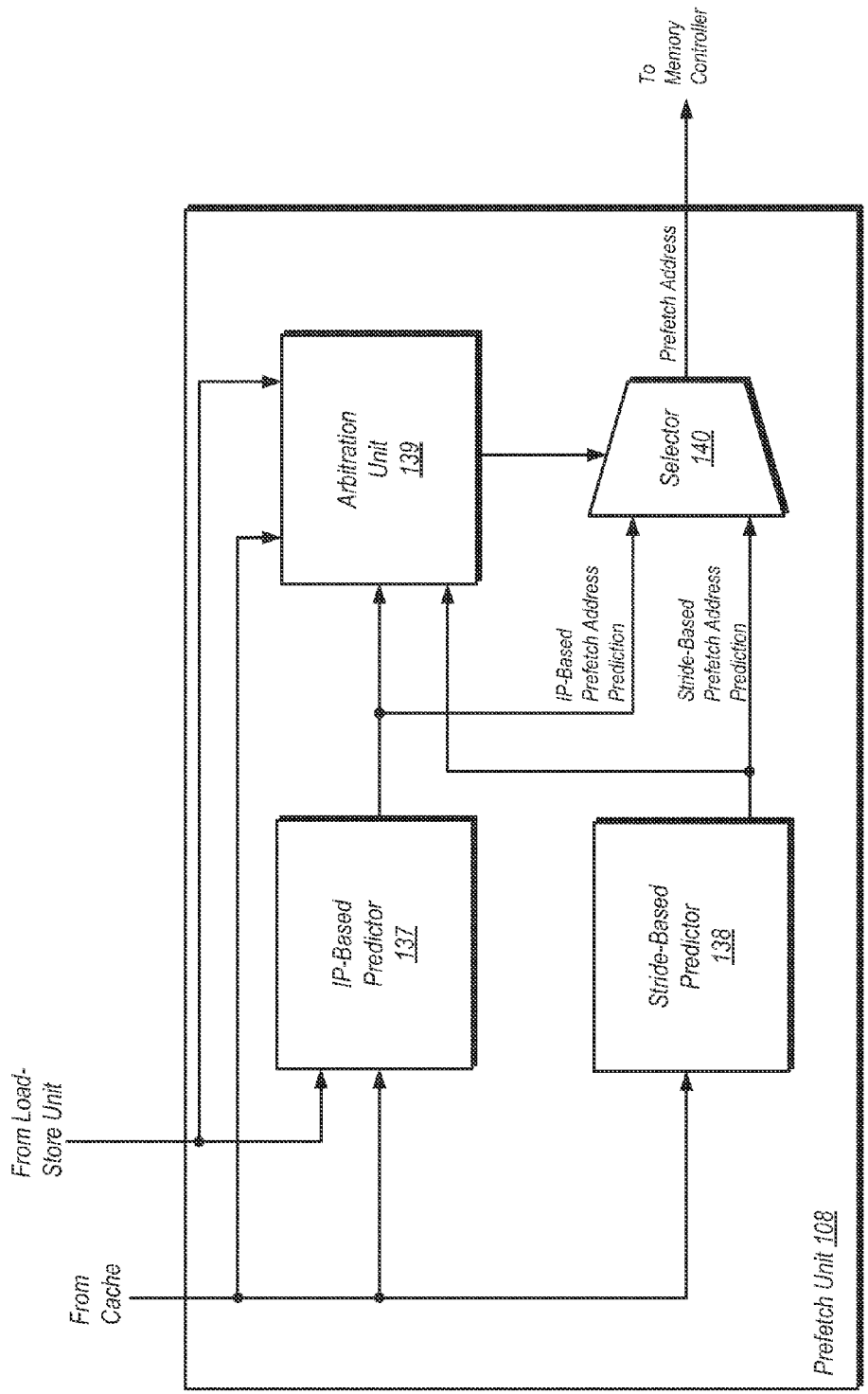
FIG. 3 is a block diagram of one embodiment a hybrid prefetch unit.

Hybrid Prefetcher:

FIG. 3 is a block diagram of one embodiment of prefetch unit 108. As previously noted, prefetch unit 108 is a hybrid prefetch unit and is thus configured to concurrently generate prefetch addresses according to two or more prefetch algorithms. In this particular embodiment, prefetch unit 108 includes two address prediction units, IP-based predictor 137 and stride-based predictor 138. Each of these prediction units is configured to predict a memory address from which an instruction to be executed will access data. These addresses may then be provided to selector 140. For a given prefetch cycle, arbitration unit 139 may select one of the generated addresses based on an arbitration scheme. Selector 140 may provide the selected address for use in performing prefetch operation, while the non-selected address is not used for prefetching during the same prefetch operation. Responsive to selector 140 providing the address, a cacheline corresponding to the predicted address may be speculatively loaded into a cache (e.g., into an L1 cache). Arbitration unit 139 may also be configured to inhibit selector 140 from providing an address in certain situations.

In the embodiment shown, IP-based predictor 137 may predict and generate an address based on an instruction pointer associated with an instruction. The instruction pointer may be indicative of a memory address of an instruction that is currently being executed or is to be executed. IP-based predictor 137 may associate the instruction pointer, and thus the corresponding instruction, with other memory addresses. This information may in turn be used to predict data access patterns associated with the instruction. For example, IP-based predictor 137 may analyze memory accesses of one or more instructions immediately preceding, in a program sequence, the instruction associated with the instruction pointer, and may in turn predict a future memory access in a region near the previous accesses. A corresponding memory address may be generated by IP-prediction unit based on this prediction.

The information used to generate the prediction and corresponding memory address may be received from load-store unit 126 (of FIG. 2) and a cache (e.g., L1 data cache 128 of FIG. 2) of processing node 11. IP-based predictor 137 may receive from load-store unit 126 the addresses associated with load operations executed by processing node 11. From L1 data cache 128 and L1 instruction cache 106, IP-based predictor may receive information regarding information accessed from the cache and the corresponding memory addresses of this information. Using this information, IP-based predictor 137 may predict an address from which data may be read for an instruction to be executed in the future. If the address provided by IP-based predictor is used in a prefetch operation, the cache line associated with the predicted address may be accessed and transferred to into one of the L1 cache memories discussed above. In some cases, the cache line may also be transferred to an L2 cache (e.g., L2 cache 129).

Stride-based predictor 138 in the embodiment shown is coupled to receive information from at least one level of cache memory (e.g., the L1 cache memories discussed above). In some cases, stride-based predictor 138 may determine a predictable pattern of memory accesses. More particularly, stride-based predictor 138 may be configured to determine when a sequence of locations spaced equally apart (in terms of respective addresses) have been accessed. When stride-based predictor 138 detects such a pattern, it may begin generating a sequence of address predictions that are equally spaced apart, i.e. a "stride". Prefetching based on memory locations at equally spaced addresses may be referred to as stride prefetching, which may be particularly useful when a computer is executing a program that uses streaming data. When these predicted addresses are used in prefetch operations, cache lines corresponding to these addresses may be transferred into one of the L1 caches of processing node 11, and may also be transferred to L2 cache 129.

For each memory cycle in which prefetching is to be performed, arbitration unit 139 in the may determine which of the addresses generated by IP-based predictor 137 and stride-based predictor 138 is to be used. As used herein, a memory cycle may be defined as one or more cycles of a clock signal that correspond to an amount of time in which information may be accessed and transferred from system memory into a cache. It is noted that at times, memory cycles may overlap each other, e.g., an address may be sent to memory for a memory read operation at the same time data is being transferred from memory responsive to a previously sent address.

Determination of the address to be provided for performing a prefetch operation in a given cycle may be performed by arbitration unit 139 according to an arbitration scheme. Various types of arbitration schemes may be used by arbitration unit 139, and these may be changed during operation of processing node 11. The types of arbitration schemes that may be employed include accuracy-based arbitration, round robin arbitration, static selection, and any other suitable arbitration scheme. Based on the results of arbitration for a given cycle, arbitration unit 139 may provide selection signals to selector 140, which may allow the selected address to be provided for performing a prefetch operation.

In one embodiment, arbitration unit 139 may implement an arbitration scheme based on the comparative prefetch accuracy of IP-based predictor 137 and stride-based predictor 138. Arbitration unit 139 may receive the address predictions made by each of IP-based predictor and stride-based predictor, and may store a number of the most recent predictions for each. In addition, arbitration unit 139 may receive information from load-store unit 126 regarding memory accesses, and from one or more of the caches of processing node 11. Load-store unit 126 may provide information about memory access requests in which it executes. Information regarding cache hits (i.e. when a query to a cache finds the requested data stored therein) may be provided from the one or more caches coupled to prefetch unit 108. Based on information regarding the memory access requests, cache hits, or both, arbitration unit 139 may determine the accuracy of both IP-based predictor 137 and stride-based predictor 138, and may select the address from the one from which the accuracy is greater. The accuracy may be determined by comparing the predictions to actual accesses. The calculated accuracy for a given one of IP-based predictor 137 and stride-based predictor 138 may increase when data stored at a predicted memory address is accessed, regardless of whether or not the requested information is cached (and regardless of whether or not that address was actually used to perform a prefetch). The calculated accuracy may fall when a predicted memory address is not accessed.

In one example, if IP-based predictor 137 predicts an address that is subsequently used to prefetch data, a cache hit resulting from a query for the prefetched data indicates that the prediction was correct. The prediction may also be determined to be correct if load-store unit 126 requests data from the predicted address for a load operation even though the address was not ultimately used in a prefetch operation. A prediction may be determined to be incorrect if no corresponding cache hits result on a cacheline that was loaded into the cache from the predicted address within a designated time when the predicted address was used in performing a prefetch operation. If an address is predicted but not used for performing a prefetch, the corresponding prediction may nevertheless be determined to be incorrect if no subsequent reads at the predicted address occur within a designated time. The designated time for determining whether a prediction was correct or incorrect may be measured in terms of clock cycles, memory access cycles, number of instructions executed subsequent to the prediction, or any other suitable metric.

In performing accuracy calculations, arbitration unit 139 may weigh correct predictions with a timing factor. Thus, as one example a correct prediction that corresponds to a memory access performed two cycles subsequent to the prediction may be considered more accurate than a correct prediction that corresponds to a memory access performed five cycles later. Utilizing a time metric in this manner may further aid arbitration unit 139 in selecting an address for performing prefetch operations when both IP-based predictor 137 and stride-based predictor 138 are correctly predicting memory addresses that will be accessed but with different amounts of time between the prediction and the subsequent access. Furthermore, when both IP-based predictor 137 and stride-based predictor 138 are correctly predicting the same addresses but at different times, arbitration unit 139 may select predicted addresses from the one of these units that is more accurate in terms of the time (e.g., as indicated by shorter duration between the predictions and the actual accesses).

In addition to determining the comparative prediction accuracy of IP-based predictor 137 and stride-based predictor 138, arbitration unit 139 may also determine if the accuracy of predictions made by these units meets or exceeds a designated threshold. If, for a given cycle, the calculated accuracy is less than the designated threshold for both IP-based predictor 137 and stride-based predictor 138, arbitration unit 139 may cause selector 140 to inhibit issuance of a predicted address, and thus inhibit the performing of a prefetch operation. This may prevent wasted memory bandwidth and cache pollution from prefetching that does not result in use of the prefetched data. If the calculated accuracy for only one of IP-based predictor 137 and stride-based predictor 138 meets or exceeds the designated threshold, then arbitration unit 139 may select its predicted addresses by default when performing prefetch operations.

Arbitration unit 139 may also inhibit prefetching operations responsive to instructions from other units of processing node 11 and/or from software (e.g., operating system software). For example, if processing node 11 begins execution of a thread in which it is known that the memory locations to be accessed are highly unpredictable (and thus the likelihood of accurate prefetch predictions is very low), arbitration unit 139 may be instructed to inhibit prefetching upon beginning execution of that thread. In another example, if processing node 11 begins execution of a thread that requires few, if any, memory accesses, prefetching may be inhibited in order that power associated with memory accesses is not wasted.

Static arbitration is another type that may be employed in some embodiments of arbitration unit 139. Using static arbitration, one of IP-based predictor 137 and stride-based predictor 138 may be selected for providing prefetch addresses. For example, if processing node 11 begins execution of a thread that utilizes streaming data from locations with highly predictable and equally spaced memory addresses, arbitration unit 139 may select stride-based predictor 138 for generating prefetch addresses, while ignoring the address predictions of IP-based predictor 137.

In some embodiments, arbitration unit 139 may be configured to perform round-robin arbitration, alternating between the predicted addresses. In embodiments having one or more prediction units in addition to IP-based predictor 137 and stride-based predictor 138 may rotate the selection among each of the prediction units.

In general, arbitration unit 139 may utilize any suitable arbitration scheme, and may direct selector 140 to select a predicted memory address when prefetching is to be performed. Furthermore, different arbitration schemes may be used at different times by arbitration unit 139. Selection of an arbitration scheme may be based on various factors, such as the nature of the thread or application being executed, user inputs, inputs from an operating system or other software, memory bandwidth, power consumption, and so forth. Performance of the arbitration scheme may also consider these factors, and may in addition consider other factors such as accuracy of the predictions made based on cache hits and/or memory accesses. Based on the selected arbitration scheme, arbitration unit 139 may dynamically select a predicted address for use in a prefetch operation. In addition, arbitration unit 139 may dynamically enable and disable prefetch operations in some situations, such as those in which the accuracy of the predictions is low.

Figure 4:
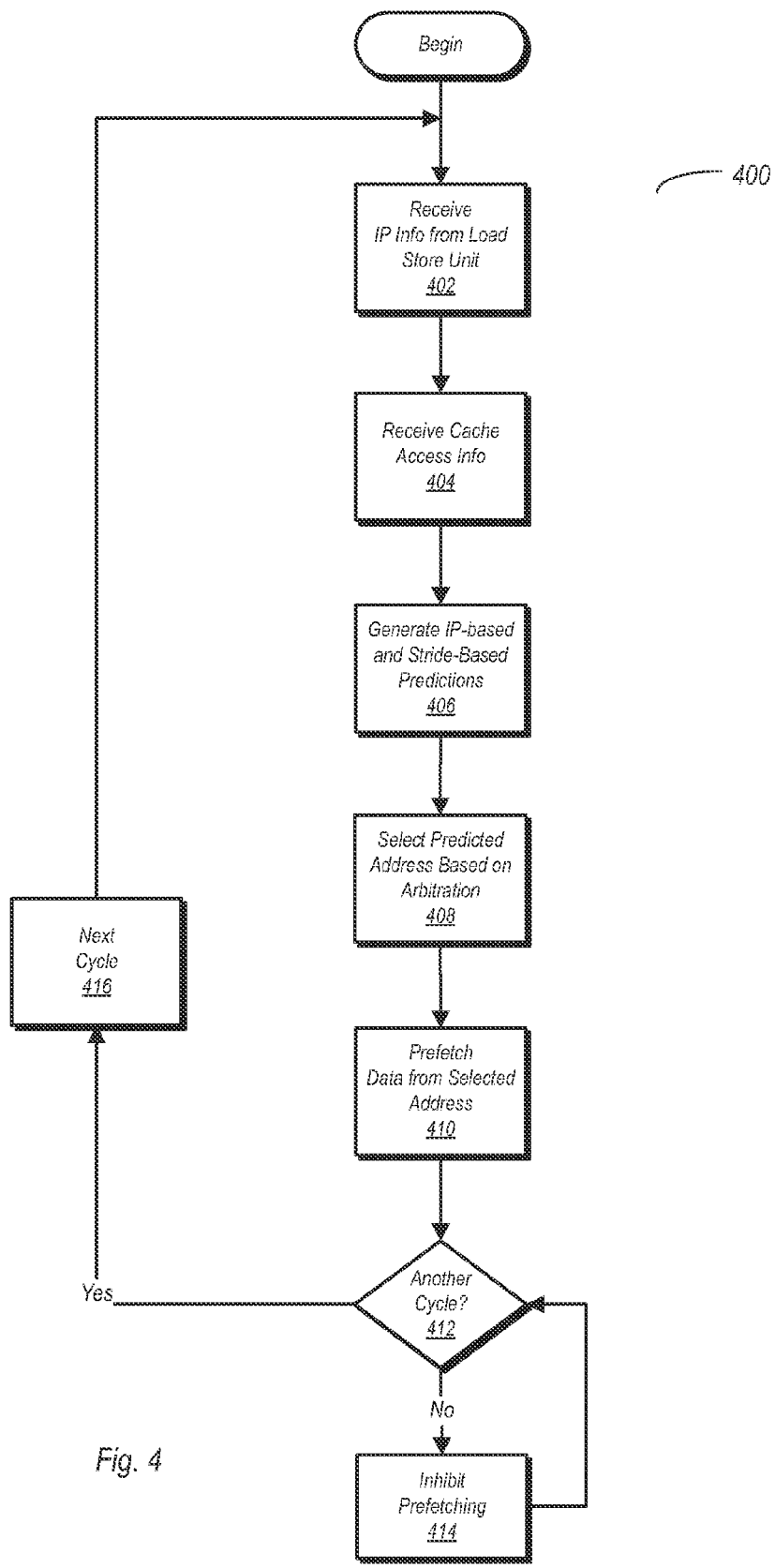
FIG. 4 is a flow diagram of one embodiment of a method of operating a hybrid prefetch unit.

Method Embodiments:

Turning now to FIG. 4, a flow diagram of one embodiment of a method for operating a hybrid prefetch unit is shown. The description of the method presented herein makes reference to various elements of FIGS. 2 and 3 discussed above. However, it is noted that the methodology illustrated by FIG. 4 may also be applied to other embodiments of a prefetch unit and corresponding processing node.

In the embodiment shown, method 400 begins with the receiving of IP information from a load-store unit (block 402). This information may be used by an IP-based predictor 137 to generate a prediction of an address at which a system memory will be accessed by an instruction that is to be executed. Cache access information may also be received (block 404), by both IP-based predictor 137 and stride-based predictor 138. Cache access information may be utilized by both of these units to generate respective address predictions.

Based on the information respectively received by IP-based predictor 137 and stride-based predictor 138, an IP-based address prediction and a stride-based address prediction may be generated by their respective units (block 406). One of these predicted addresses may be selected for performing a prefetch operation based on arbitration (block 408) performed by arbitration unit 139. The arbitration may be performed using one of a number of different arbitration schemes. Some of these arbitration schemes may consider the history of previously generated predictions (and thus their accuracy), as well as other factors, such as the type of thread/application that is executing on processing node 11.

A prefetch operation may be performed using the selected address (block 410). In performing a prefetch operation, data may be read from system memory and stored in an L1 cache (either instruction cache 106 or data cache 128). In addition, the prefetched data may also be stored in L2 cache 129.

If another cycle of prefetching is to be performed (block 412, yes), then the method transitions to the next cycle (block 416) and begins again. Otherwise, if no prefetching is to performed during the next cycle (block 412, no), then arbitration unit 139 may inhibit selector 140 from providing a prefetch address during the next cycle (block 414). The method may then return to block 412, where the check for prefetching in the next cycle may be performed again.

Figure 5:
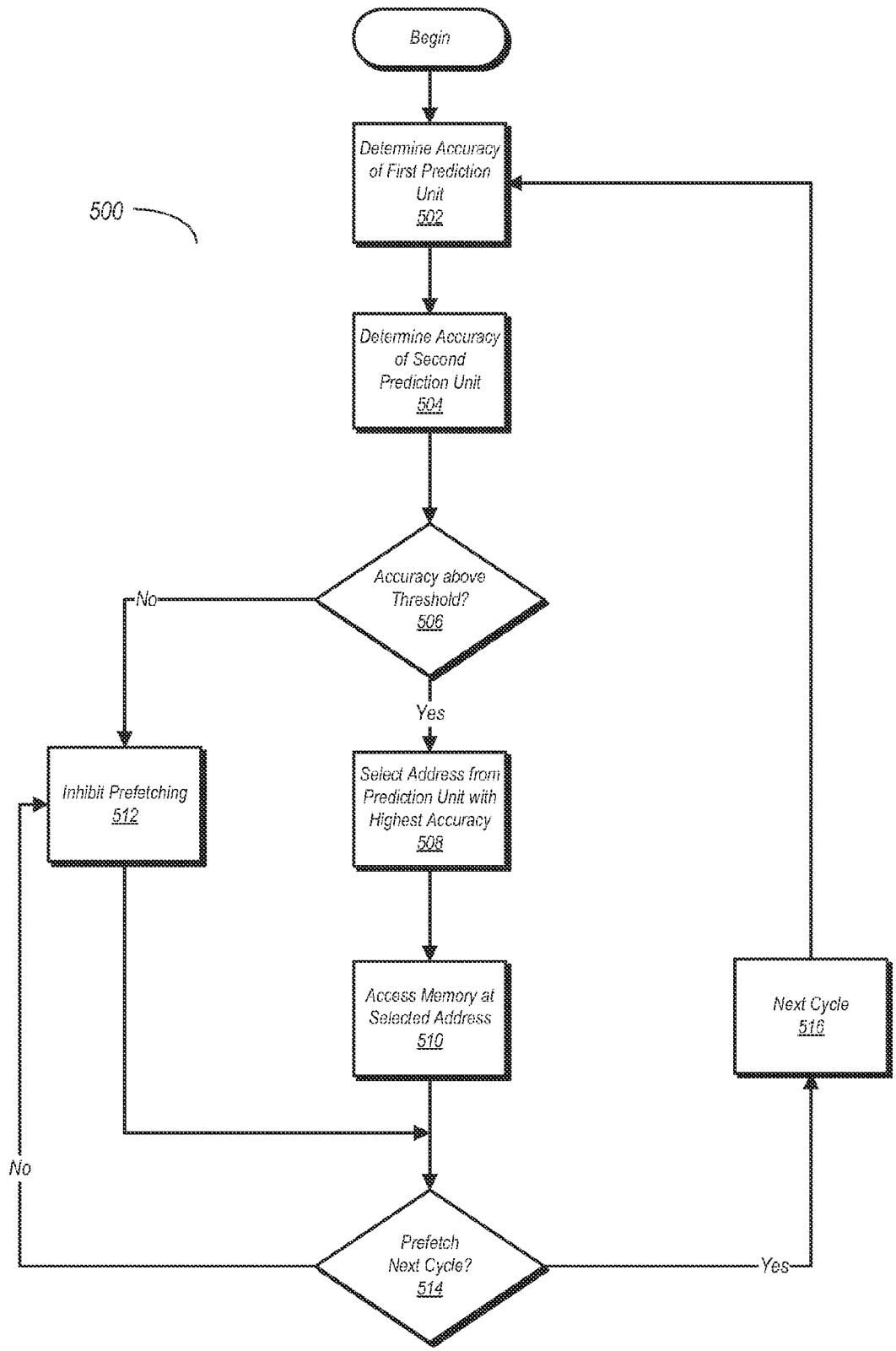
FIG. 5 is a flow diagram of one embodiment of a method for operating an arbitration unit.

Turning now to FIG. 5, a flow diagram of one embodiment of a method for operating an arbitration unit is shown. More particularly, method 500 is directed to a method of arbitrating between two different prediction units based on the comparative accuracy of their respective predictions. It is noted however that accuracy-based arbitration is only one of many possible schemes that may be used for arbitrating to select an address from among two or more addresses predicted by two or more corresponding prediction units.

Method 500 begins with the determining of the accuracy of a first prediction unit (block 502) and a second prediction unit (504). Determining the accuracy of each prediction unit may include maintaining a record of predictions made by each of the prediction units. Accuracy determinations may also include maintaining a record of cache hits and memory accesses (e.g., reads of memory), as well as an amount of time elapsed between a prediction and an access when a predicted address matches an accessed address. An arbitration unit may use this information to determine whether or not addresses previously predicted by a particular prediction unit correspond to an actual memory access, and if so, the amount of time that elapsed between the prediction and the access.

The determined accuracy values for each of the prediction units may be prepared to an accuracy threshold. If the determined accuracy value for none of the prediction units is equal to or above the accuracy threshold (block 506, no), then prefetching may be inhibited for at least the next cycle (block 512). Inhibiting prefetching when prediction accuracy is low may reduce cache pollution and wasted bandwidth in the memory subsystem.

If the accuracy of at least one prediction unit meets or exceeds the threshold (block 506, yes), then the address from the most accurate prediction unit may be selected (block 508). The selected address may be provided for a prefetch operation, and the memory may be accessed at that address (block 510). Accessing the memory at the selected address may include transferring a cache line into a cache (e.g., into an L1 cache).

If no prefetching is to be performed for the next memory cycle (block 514, no), then prefetching may be inhibited (block 512) with a subsequent check being performed for the next cycle. In addition to low prediction accuracy, as discussed above, prefetching may be inhibited for other reasons. Such reasons may include the preservation of memory bandwidth for power savings or other considerations, a change of application from a memory-bounded application to a compute-bounded application, and so forth. If prefetching is to be performed for the next cycle (block 514, yes), upon transition to the next cycle (block 516), the method may return to accuracy determination for the various prediction units, beginning at block 502.

Figure 6:
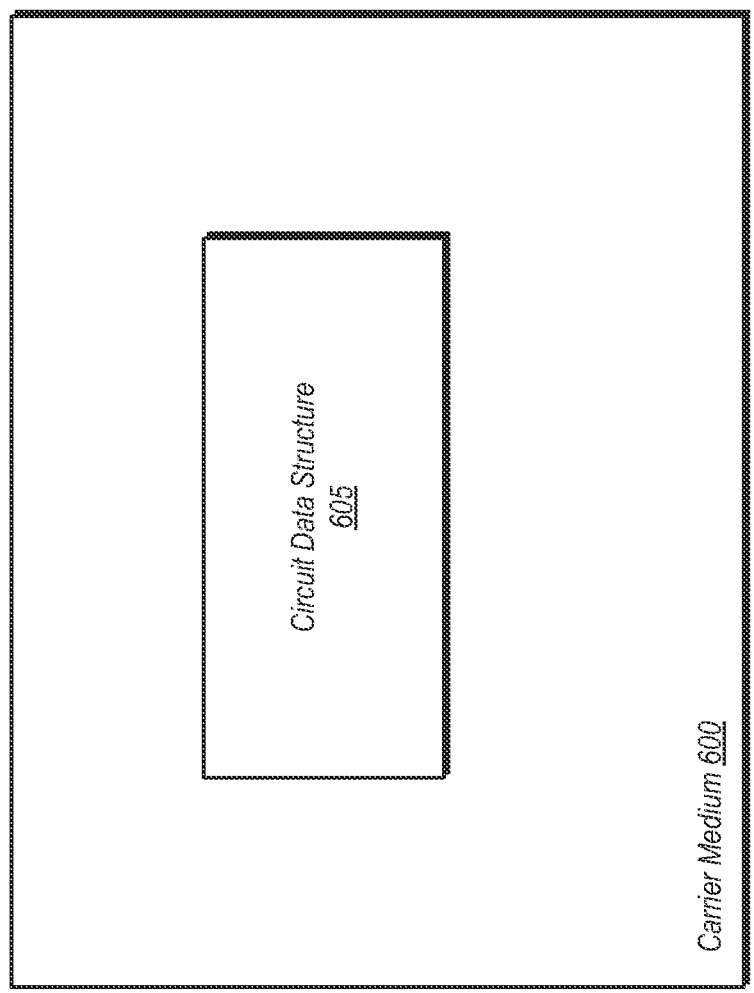
FIG. 6 is a block diagram of one embodiment of a carrier medium.

Computer Readable Medium:

Turning next to FIG. 6, a block diagram of a non-transitory computer accessible storage medium 600 including a data structure 605 representative of system 10 (of FIG. 1) is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, circuit data structure 605 as carried on the computer accessible storage medium 600 may be a database or other type of data structure which can be read by a program and used, directly or indirectly, to fabricate the hardware comprising the system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising IC 2 or other circuitry of system 10. The netlist may then be placed and routed to produce a data set describing geometric shapes to be applied to masks. The masks may then be used in various semiconductor fabrication steps to produce a semiconductor circuit or circuits corresponding to the processor 100. Alternatively, the database on the computer accessible storage medium 600 may be the netlist (with or without the synthesis library) or the data set, as desired.

While the computer accessible storage medium 600 carries a representation of system 10 and IC 2, other embodiments may carry a representation of any portion of system 10 and IC 2, as desired, including any set of agents (e.g., hybrid prefetch unit 108, load-store unit 126, etc.), or portions thereof.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A system comprising:
a processor having a prefetch unit configured to generate addresses for accessing data from a system memory, the prefetch unit including:
a first prediction unit configured to generate a first memory address according to a first prefetch algorithm;
a second prediction unit configured to generate a second memory address according to a second prefetch algorithm; and
an arbitration unit configured to select either the first or second memory address for use during a given prefetch operation, and wherein the arbitration unit is further configured to inhibit prefetching responsive to determining that power associated with prefetching will be wasted; wherein the arbitration unit is configured to arbitrate between the first and second addresses using a round-robin arbitration scheme for a first arbitration cycle, and further configured to arbitrate using an accuracy-based arbitration scheme for a second arbitration cycle.

2. The system as recited in claim 1, wherein the first prediction unit is configured to predict and generate the first memory address based on an instruction pointer, and wherein the second prediction unit is configured to generate the second memory address based on a stride prediction.

3. The system as recited in claim 2, wherein the arbitration unit is coupled to receive cache hit information from a cache, and wherein, based on the cache hit information, the arbitration unit is configured to determine a first prediction accuracy associated with the first prefetcher and a second prediction accuracy associated with the second prefetcher.

4. The system as recited in claim 3, wherein the arbitration unit is configured to select the one of the first and second memory addresses based on a greater value of a respective one of the first or second prediction accuracy.

5. The system as recited in claim 1, wherein the prefetch unit is coupled to receive addresses corresponding to memory accesses from a load-store unit of the processor.

6. The system as recited in claim 1, wherein the system further comprises a memory controller coupled to the system memory, wherein the processor is configured to provide the selected one of the first and second memory addresses to the memory controller, and wherein the memory controller is configured to transfer data from the selected one of the first and second memory addresses into a cache responsive to receiving the selected one of the first and second memory addresses from the memory controller.

7. The system as recited in claim 6, wherein the memory controller is configured to transfer one or more cache lines into the cache responsive to receiving the selected one of the first and second memory addresses.

8. The system as recited in claim 6, wherein the cache is a level one (L1) cache, and wherein the memory controller is further configured to transfer data from the selected one of the first and second memory addresses into a level two (L2) cache.

9. The system as recited in claim 1, wherein the arbitration unit is configured to select the first memory address during a first memory cycle and further configured to select the second memory address during a second memory cycle.

10. A method comprising:
   a first prediction unit generating a first memory address according to a first prefetch algorithm;
   a second prediction unit generating a second memory address according to a second prefetch algorithm;
   an arbitration unit selecting either the first or second memory address for use in a given prefetch operation; and
   accessing data from the selected one of the first and second memory addresses in the given prefetch operation,
   wherein the method further comprises the arbitration unit inhibiting issuance of either of the first or second memory addresses responsive to determining that power associated with prefetching will be wasted; wherein the method further comprises:
      during a first arbitration cycle, the arbitration unit arbitrating between the first and second memory address based on a round-robin arbitration scheme; and
      during a second arbitration cycle, the arbitration unit arbitrating based on an accuracy-based arbitration scheme.

11. The method as recited in claim 10, further comprising:
   generating the first memory address based on an instruction pointer; and
   generating the second memory address based on a stride prediction.

12. The method as recited in claim 11, further comprising:
   receiving cache hit information indicative of cache hits;
   determining a first prediction accuracy of the first prediction unit based on the cache hit information; and
   determining a second prediction accuracy of the second generator based on the cache hit information.

13. The method as recited in claim 12, further comprising selecting the first memory address or second memory address depending on which of the first prediction accuracy and the second prediction accuracy is greater.

14. The method as recited in claim 10, further comprising a load-store unit providing addresses of memory accesses to the first prediction unit and the second prediction unit.

15. The method as recited in claim 10, further comprising transferring data, to a cache, from the selected one of the first and second memory addresses of a system memory.

16. The method as recited in claim 15, wherein the cache is a level one (L1) cache, and wherein the method further comprises transferring the data from the selected one of the first and second memory addresses to a level two (L2) cache.

17. The method as recited in claim 10, further comprising selecting the first memory address during a first processor cycle and the second memory address during the second memory cycle.

18. A non-transitory computer readable medium storing a data structure which is operated upon by a program executable on a computer system, the program operating on the data structure to perform a portion of a process to fabricate an integrated circuit including circuitry described by the data structure, the circuitry described in the data structure including:
   a prefetch unit configured to generate addresses for accessing data from a system memory, the prefetch unit including:
      a first prediction unit configured to generate a first memory address according to a first prefetch algorithm;
      a second prediction unit configured to generate a second memory address according to a second prefetch algorithm; and
      an arbitration unit configured to select either the first or second memory address for use during a given prefetch operation , and wherein the arbitration unit is further configured to inhibit prefetching responsive to determining that power associated with prefetching will be wasted, wherein the arbitration unit is configured to arbitrate between the first and second addresses using a round-robin arbitration scheme for a first arbitration cycle, and further configured to arbitrate using an accuracy-based arbitration scheme for a second arbitration cycle.

19. The non-transitory computer readable medium as recited in claim 18, wherein the first prediction unit described in the data structure is configured to predict and generate the first memory address based on an instruction pointer, wherein the second prediction unit described in the data structure is configured to generate the second memory address based on a stride prediction, and wherein the arbitration unit described in the data structure is configured to, based on cache hit information, determine a first prediction accuracy associated with the first prediction unit and a second prediction accuracy associated with the second prediction unit.

20. The non-transitory computer readable medium as recited in claim 18, wherein the data structure comprises one or more of the following types of data:
   HDL (high-level design language) data;
   RTL (register transfer level) data;
   Graphic Data System (GDS) II data.

* * * * *